INVENTOR.
WILLIAM J. MILLER
BY George J. Croninger
ATTORNEY.

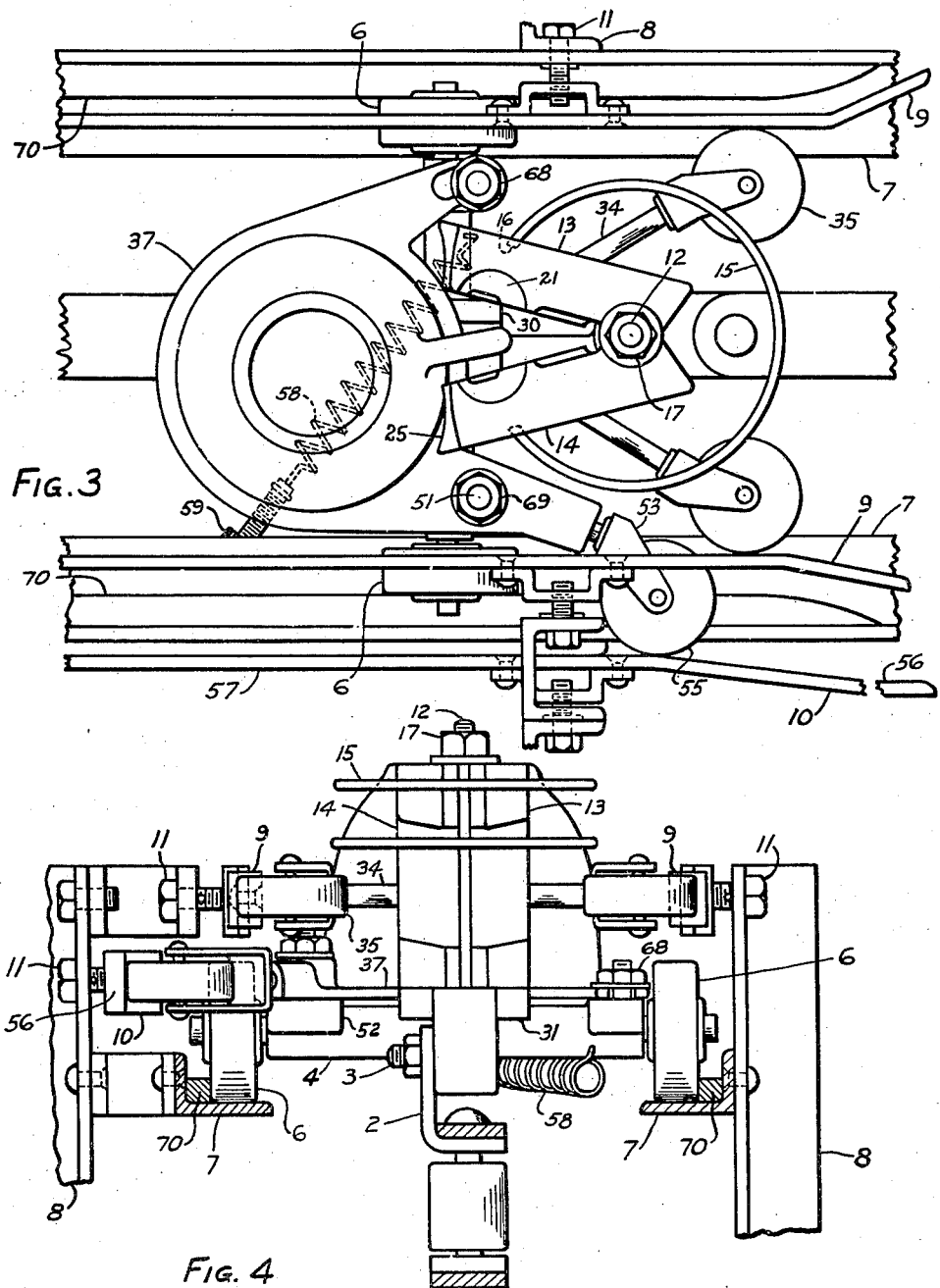

April 24, 1945.  W. J. MILLER  2,374,555
METHOD AND APPARATUS FOR APPENDAGING POTTERY WARE
Filed May 14, 1943   4 Sheets-Sheet 3
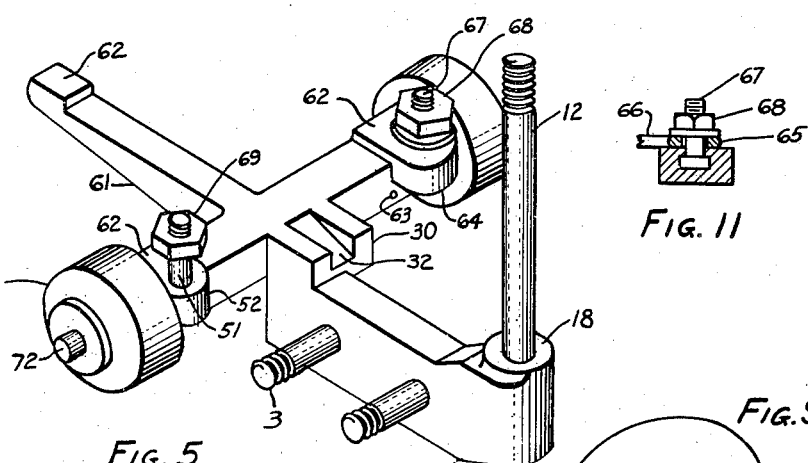
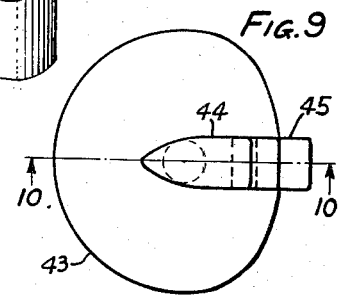
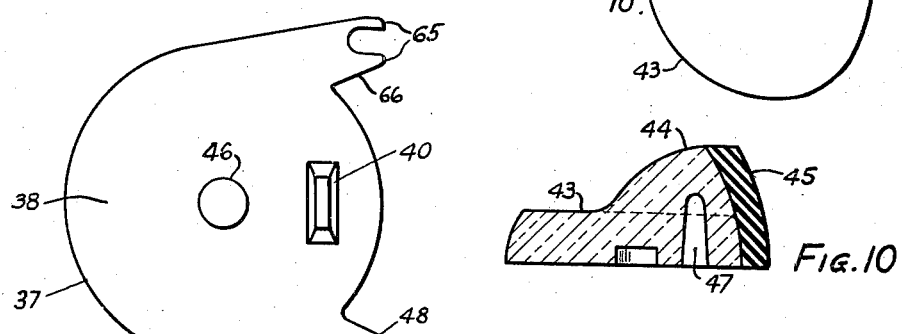
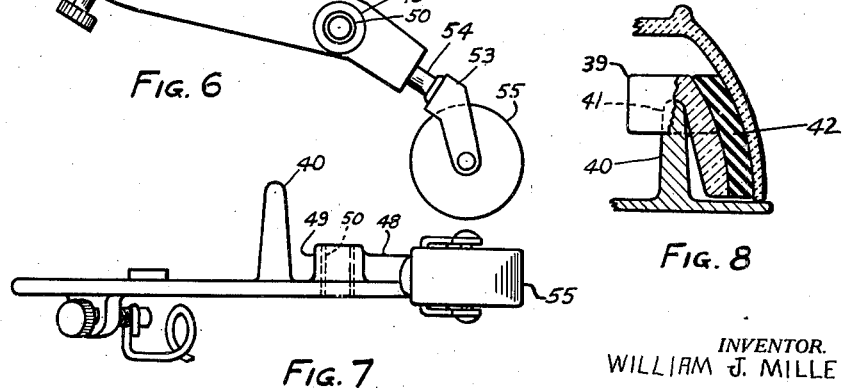
INVENTOR.
WILLIAM J. MILLER
BY George J. Cleminger
ATTORNEY.

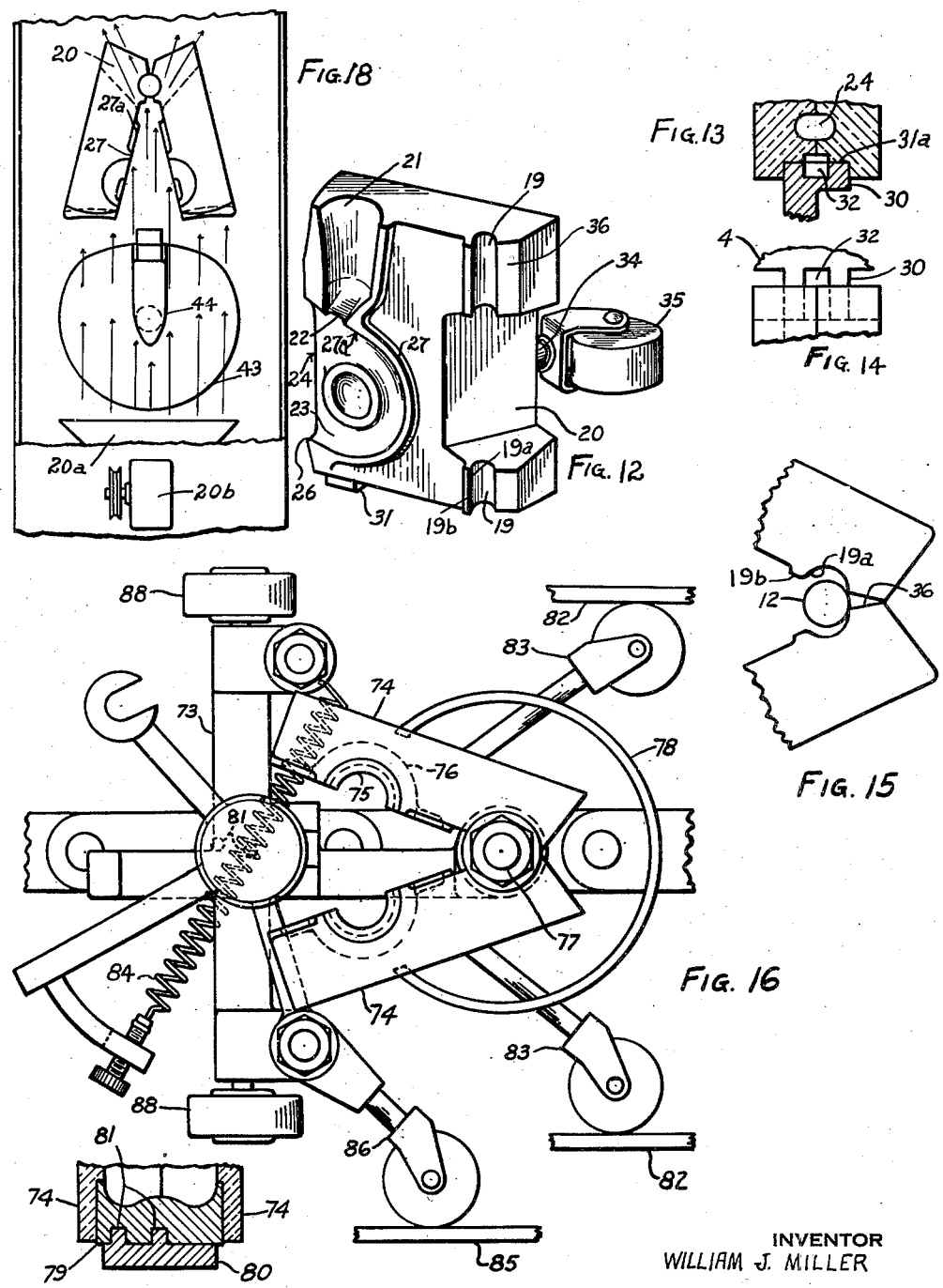

Patented Apr. 24, 1945

2,374,555

UNITED STATES PATENT OFFICE 2,374,555

METHOD AND APPARATUS FOR APPENDAGING POTTERY WARE

William J. Miller, Swissvale, Pa., assignor to Miller Pottery Engineering Company, Swissvale, Pa., a corporation of Pennsylvania Application May 14, 1943, Serial No. 486,984

36 Claims. (Cl. 25—29)

This invention relates to methods and apparatus for appendaging pottery ware, particularly apparatus for slip casting and uniting appendages to pottery ware in accordance with the method of my United States Patent No. 2,217,346, wherein the body of the article, for instance, a dinnerware cup, is prefabricated and dried to leatherhardness, then topped and sponged and then applied to an appendage mold, for example, a handle mold, in such fashion as to bring the cavity opening in the mold into registry with the place on the cup determined upon for the handle. The appendage is formed and permanently united to the ware by filling the mold with liquid slip of optimum fluidity, water content, and composition, and permitting the ware and mold to remain in associated relation until the slip solidifies in the mold.

One form of apparatus is disclosed in the copending application of William J. Miller and Ashley J. Reek, Serial No. 392,276, filed May 7, 1941, wherein a plurality of appendage units including a separable appendage mold and relatively movable ware support is attached to an endless chain conveyor which transports the carriers to ware receiving, mold filling, mold emptying and mold drying positions, the molds being opened and closed automatically at predetermined locations along the path of travel thereof. The ware support and ware are moved automatically relative to the mold, to grip the ware in leakproof sealed relation with the ware receiving surface thereof and to release said grip, and after the mold is opened, retract the ware therefrom after the appendage has been formed and attached to the ware. The appendaging unit per se just described is covered in a co-pending divisional application, Serial No. 473,670, filed January 27, 1943, of the application supra.

The present invention has to do with a novel form of appendaging unit of the same general type as that previously described in application Serial No. 473,670, which is adapted for use in appendaging pottery ware by automatic procedure as disclosed in application Serial No. 392,276. Furthermore, the appendaging unit of the present invention may be considered as an improvement on application, Serial No. 473,670.

The objects of this invention are to provide a simplified structure unit for appendaging pottery ware having a minimum of operating parts of simple, low upkeep and manufacturing cost construction; to provide for quickly exchanging molds and ware supports while in operation; to provide a self-cleaning mold and frame structure; to provide for the free flow of drying air longitudinally through the mold into the next mold in line, the air to be directed against the sharp mating edges of the leakproof sealing joint surrounding the molding cavity to dry, harden and prolong the life thereof and to scavange them and the interior of the mold of dirt and foreign matter; to provide a mold having hardened, lubricated, wear-resistant hinge bearings; to provide for properly and accurately centering the ware relative to the ware receiving surface of the mold, particularly incident to withdrawal of the ware therefrom; to provide for spreading the mold sections apart simultaneously and with uniform movement; to reduce strain on the ware by relaxing clamping pressure as soon as a shell has formed in the mold; to eliminate or substantially reduce fin formation and the cost of removing the same; to provide a mold and ware carrier having automatic wear take-up provisions; to provide for sealing variable thickness wall ware against the mold with predetermined optimum self-adjusting pressure; to substantially eliminate the necessity for manual adjustment and to provide an improved form of ware support including a one-piece combination ware backing up and ware positioning, brim correcting and ware identifying member and generally to reduce appendaging cost and increase production; to provide for the making of slip cast ware of other shapes such as creamers, sugars, vases, etc., by apparatus embodying the principles of this invention and in this type of apparatus to provide for the automatic removal of ware from the mold when formed.

A plurality of appendaging units are preferably attached to a chain conveyor for transporting the same over an undulating production line. The unit comprises broadly a wheeled undercarriage, whose frame is preferably of onepiece die cast construction having a hinge pin on which the separable mold is assembled and held thereon by one or more easily removed spring clips. Each mold section has a cam follower cast integral therewith to be actuated preferably by a cam or other suitable means to open the mold. The ware support, which is movably mounted and guided to move in a predetermined path on the wheeled undercarriage, comprises a base portion on which is movably mounted a ware backing-up member having a cushioned surface for pressing the ware wall from within against the ware receiving surface of the mold. In one embodiment, the ware backing-up member is combined with an article gauge to provide for sizing the ware at the time it is placed on the appendaging unit and each tinted and sized for preventing or guarding against the application of the wrong type of ware thereto. It may be also made substantially circular to restore out-of-round ware brims to proper shape. In practical commercial operation, each unit or group of units in succession is tooled to appendage a different shape or size of cup and revision of types is frequently required, therefore, quick exchange of molds and ware moving tools, preferably without interrupting production, contributes to lower operating labor cost, increased production and practicability of the method. The actuating means for relatively moving the ware positioned on the support and mold into appendaging relation is in the form of a pressure equalizing resilient member, for instance, a long spring, which will draw the ware support and mold together with that portion of the wall of the ware which is to be appendaged therebetween at an optimum predetermined adjustable pressure value, regardless of slight differences in ware wall thickness of successive pieces of ware.

Other objects and advantageous features will be noted in the accompanying drawings and detailed description wherein:

Fig. 3 is a top plan view of the apparatus of Fig. 1 showing the mold being cammed open with the ware support in retarded position to thereby permit removal of the appendaged article.

Fig. 4 is an end elevation partly in section looking in the direction of arrows 4 of Fig 1.

Fig. 5 is a perspective view of the wheeled support forming the undercarriage of the unit.

Fig. 6 is a plan view of the ware support to be mounted on the wheeled carriage of Fig. 5.

Fig. 7 is a side elevation of the ware support of Fig. 6.

Fig. 8 is a sectional elevation of one form of floating ware backing-up member forming a detachable part of the ware support.

Fig. 9 is a top plan view of a one-piece ware backing-up member and article diameter gauge.

Fig. 10 is a side elevation of the device of Fig. 9.

Fig. 11 is a detail in section of the stop for limiting the approach of the mold and ware support.

Fig. 12 is a perspective view of one of the separable appendage mold sections.

Fig. 13 is a fragmentary sectional view of the centering formation supporting the front end of the mold and Fig. 14 is a plan view of the same.

Fig. 15 is a fragmentary detail plan of the mold hinge joint showing how the mold sections are fulcrumed apart to permit easy removal from the hinge pin.

Fig. 16 is a plan view of apparatus embodying principles of this invention for slip casting complete ware shapes such as creamers, sugars, etc.

Fig. 17 is a detail in section of the ware supporting and bottom forming assembly of the apparatus of Fig. 16.

Fig. 18 is a plan view diagrammatically showing how the molds are dried between fillings.

Figure 1:
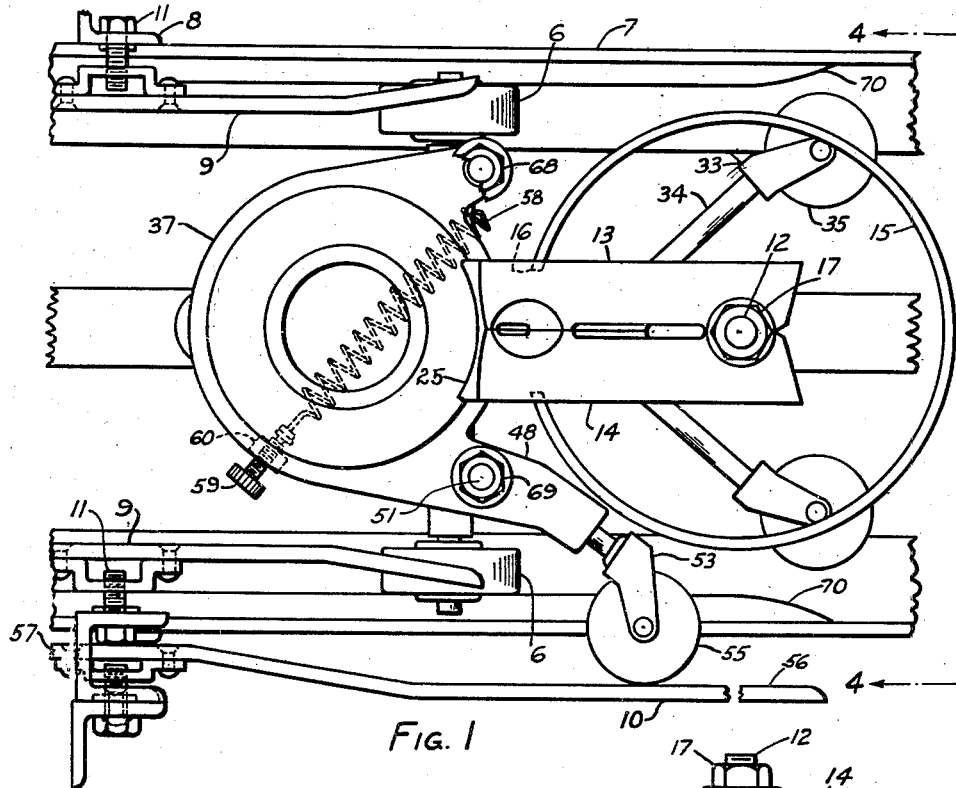
Fig. 1 is a top plan view of the preferred form of appendaging unit showing the mold in closed positions with an article of ware in sealed relation therewith.
Figure 2:
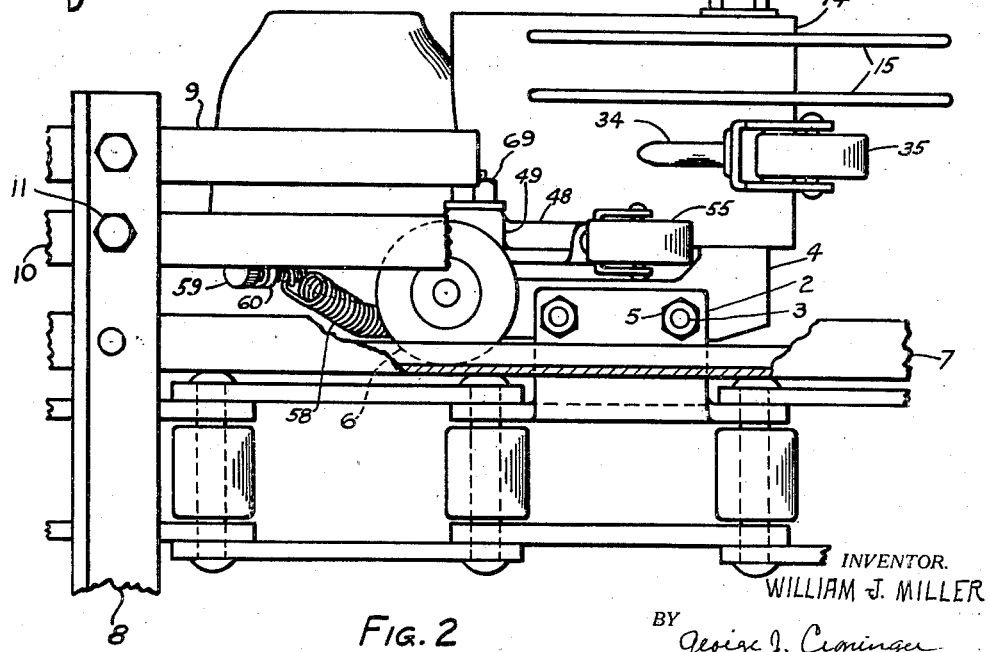
Fig. 2 is a side elevation of the apparatus of Fig. 1 with the parts in the same position.

With reference to Figs. 1, 2 and 5, 1 is an endless chain conveyor, preferably travelling in substantially horizontal loops for transporting the appendaging units over a production line in accordance with the disclosure of application, Serial No. 392,276. At spaced locations along the chain are upstanding apertured lugs 2 for receiving the bolts 3 of the wheeled undercarriage 4 of the unit to be secured thereto by nuts 5. The wheels 6 of the carriage roll on and are horizontally and laterally guided by horizontally spaced stepped rails 7 forming a track supported by uprights 8 which also support elongated, spaced mold opening cams 9 parallel with and above the track and a similar ware support retracting cam 10 that are secured thereto for lateral adjustment by necked screws 11.

The undercarriage 4 has a vertical hinge pin 12 at one end thereof on which the two sections 13 and 14 of a separable appendage casting mold are assembled and held together by one or more spring clips 15 whose ends are positioned in sockets 16 formed in the outside walls of each section approximately opposite the center of the mold cavity.

The mold may be instantly snapped on and off the hinge pin during travel thereof by first spreading the sections manually against the tension of springs 15. Adjustable flanged nut 17 on the hinge pin and boss 18 on the frame 4 vertically position, and arcuate bearing portions 19, horizontally position the mold halves. Cut away clearance portions 36 permit limited opening of the mold and also enable quick disengagement from the hinge pin when excessively opened manually (see Fig. 15).

The mold is preferably constructed somewhat as disclosed in application, Serial No. 473,670, filed January 27, 1943, of William J. Miller and Ashley J. Reek, and comprises, briefly, two sections each formed with a sprue portion 21 connected by a short restricted, preferably slit-like passage 22 with a molding cavity portion 23, Fig. 12, of desired configuration. The molding cavity may have one or more outlets 24 through the ware receiving surface portion 25 which portion is shaped to fit the external surface of the ware, particularly at the outlet brim. The example teacup shown has a circumferentially and vertically curved shape.

The brim of the opening on surface 25 may be slightly raised and/or the cup wall encompassed by the opening may be slightly deflected into the opening to insure sharp juncture outline and prevent leakage, overflash or fin formation. The brim of the opening may also be rounded as at 26 to form a fillet at handle to cup juncture, Fig. 12, to provide additional juncture area and strength and enable quicker and more thorough cleaning after use. Manually stuck-on handles are inherently devoid of fillets.

Surrounding each molding cavity portion is a narrow, raised, joint sealing formation 27 which may be quickly dressed, for instance by scraping, into perfect mating liquid tight joint sealed relation immediately adjacent and/or at the cavity brim surface when the mold is closed to thereby eliminate or reduce fin projection on the appendage. By eliminating or reducing the fin projection, fettling costs are eliminated or greatly reduced.

This formation also exposes more drying surface area adjacent the joint which expedites drying and consequent hardening of the fragile sharp edge corner 27a from which the top of the formation is gently inclined away from the cavity. When blunted through long use or accident, the sharp edge corners may be quickly restored by redressing which prolongs the useful life of the mold. Furthermore, by sloping the tops of the formations 27, the joining pressure is concentrated directly at the edge of the molding cavity, which reduces the joint area extent within which dirt can lodge and prevent perfect engagement and sealing of the joint which otherwise would result in increasing the amount of fin formation, deterioration of the joint, leakage of slip, lower production and increase production and mold upkeep cost. Dirt lodged within the joint clearance area will not prevent perfect sealing.

As part of a step in the preservation of the sharp edge of the sealing joint, I propose to use a thick slip in casting the appendages that is to say a slip having appreciably quicker setting characteristics than ordinary.

An air passage 20 through the hinge joint, Fig. 12, formed between the mold halves, when open, permits passage and horizontal impingement of heated drying air, under forced draft, prolonged blast from the nozzle 20a of an overhead blower 20b arranged above the track, against the mold cavity walls (see arrows, Fig. 18) and edge corners 27a of the joint to dislodge any adhering dirt and thoroughly dry the vital surfaces prior to the next filling. Wet plaster is very soft and the edge 27a crumbles off quickly unless measures are taken to keep it dried out and hard between fillings. In manual practice, the conventional molds are short lived because the appendages are stripped and the mold reused without intermediate drying.

This space divides the hinge bearings to concentrate the hinge pin bearing area of the mold on the extreme upper and lower portions thereof to further stabilize the mold on the hinge pin and prevent tilting thereof. A clearance space, 29, Fig. 2, between the carriage frames and mold permits dirt to escape.

To insure predetermined lateral and angular location of the mold joint relative to the ware and to prevent lateral shifting of one mold section in case the opening of one section should precede the other, which might crack or break the appendage adjacent the ware, I provide a divided centering abutment 30, Figs. 5, 13 and 14, on the carriage and depending abutment lugs 31 on the extreme lower forward portions of the mold sections which snugly co-operate to hold each section stable should the other section move away.

To further stabilize the mold when closed and prevent tilting thereof when a feeder nozzle is forcefully applied in sealing engagement over the sprue mouth, ledges 31a are provided which rest on the top of abutment 30, there being a sloping clearance space 32 between the divided abutment for dirt to drop through.

To open the mold, each section has cast integral therewith a cam follower assembly 33 including an attaching stem 34 extending outwardly and rearwardly at an angle from the mold section, and a roller which projects beyond the hinge pin when the mold is assembled thereon. The assembly is preferably held in a location socket or jig associated with the mold making case, until the plaster of which the mold is made has set, to insure predetermined uniform location of the roller and substantially uniform instant and extent of mold spreading through contact with cams 9 or otherwise. The cam follower assembly is preferably anchored in the mold at a point slightly in rear of the mold cavity 23 and slightly below the longitudinal, horizontal centerline of the section.

The mold sections are provided with arcuate bearing portions 19, at top and bottom, whose bearing surfaces are preferably hardened and lubricated as by painting when dry with graphited, thinned shellac. They are held in snug engagement with the hinge pin 12 by springs 15 and the lower hinge formations rest on the top of boss 18 which vertically positions and supports the mold. Adjustable lock nut 17 prevents the mold sections from creeping upward. At rear of the bearing, the hinge joint is cut away as at 36 to provide fulcrum surfaces which permit opening the mold to a limited extent before said surfaces engage. Further spreading, by hand, fulcrums the mold sections apart and disengages the mold from the hinge pin and enables quick, horizontal rearward shifting of the mold sections when the ware is pressed against the mold, the forward bearing walls are extended as at 19a equi-distantly with the formations 27 and the top surfaces 19b are faced off to provide flat mating surfaces. Thus, I provide a simple, practical, low cost, durable mold and operating means, particularly well adapted to this method of mass production wherein several thousand molds may be simultaneously employed.

The ware support 37, Fig. 6, has a substantially circular table-like ware receiving surface 38 on which the ware rests on its brim in inverted position, over a ware backing-up member 39, Fig. 8, which is floatingly mounted on the rounded top of a pyramid-like formation 40 projecting upwardly from the surface 38 and received in a vertical rectangular recess 41 of the backing-up member. Said member has a pressure equalizing cushion surface 42 composed of soft or sponge rubber or the like shaped to fit the internal surface of the ware and approximately same size and shape as the mold opening and located opposite said opening to gently but firmly press the associated ware wall portion against the mold in leakproof sealed relation with the brim of the mold opening. It is preferred to first wet the surface of the ware to which the appendage is to be attached, with water containing a suitable percentage of electrolyte to fluidize the ware surface and expedite knitting and increase the strength of the bond. Being resilient, the cushion surface adapts itself to surface irregularities and applies substantially uniform sealing pressure around the entire cup surface contacting the brim of the mold opening. The ware which is leather-hard at this stage may yield slightly to conform to slight errors in surface contact conformation.

Another form of ware backing-up and centering member shown in Figs. 9 and 10 comprises a one-piece plaster cast having a substantially circular gauge block portion 43 (which also restores out of round ware brims to circular proportions), and a narrow vertical and radial projection 44 streamlined so as to direct drying air against vital surfaces of the mold, see Fig. 18, with a cushion surface 45 mounted on the circumference of the circle. A set of these blocks in various sizes is provided to fit the various sizes of ware to be appendaged. Instead of being floatingly mounted on the ware support, the gauge block rests flat on the surface of the ware support over the centering pin 46 with the projection 44 received in a vertical notch 47 to prevent angular displacement and tilting.

The ware support has a tangential extension 48 with an apertured boss 49 provided with a bushing 50 which receives the vertical pivot pin 51, Fig. 5, mounted in a horizontal extension 52 at one side of the undercarriage axle frame in approximate alignment with the ware receiving surface of the mold when closed. The ware supports pivots on this axle to move the ware into and out of engagement with the mold, the ware surface finally approaching the mold in a path substantially in alignment with the mold joint. To actuate the ware support in timed relation with the opening and closing of the mold, there is provided a cam follower 53 whose stem 54 projects outwardly beyond the end of extension 48. The cam roller 55 first engages the leading section 56 of cam 10, Figs. 1 to 4 inclusive, which retracts the support just sufficient to reduce or release clamping pressure of the ware surface on mold, then the mold is opened through rollers 35 contacting twin cams 9, then the roller 55 is depressed all the way by section 57 of cam 10 to fully retract the cup and provide ample clearance so it may be quickly removed from and the next cup applied to the ware support (see Fig. 3).

The ware support is tensioned in normal clamping position by a long, pressure equalizing coil spring 58 which has one end rotatably secured to a manually adjustable stud 59 threaded through boss 60 on the perimeter of the table and passes under the tail piece 61 of the undercarriage which has a three-point contact platform 62 to undersupport and stabilize the ware support, and is hooked in a hole 63 in the axle frame below the stop screw extension 64 to thereby always pull against the pivot pin and take-up pivot wear and consequent lost motion in the same direction whether advanced or retracted. When the cam roller is slowly released, the spring rotates the ware support to bring the ware into nested relation with the closed mold, see Fig. 1, the forks 65 of extension 66 straddling the stop stud 67 and being snugly received under an adjustable flanged nut 68 thereon, see Fig. 11, which together with nut 69 on pivot 51 prevents upward tilting of the table when the ware is thrust against the mold. The stud 67 also limits excess forward movement of the ware support in case no ware has been applied. Having a three-point support on the frame, the table is stabilized.

Variations in ware wall thickness should not exceed 1/16" and the spring is relatively of great length, therefore, a substantially uniform sealing pressure of predetermined value is applied to all ware of substantially equal wall thickness. Exchanging ware backing-up members, without interrupting production is quickly effected.

To insure predetermined lateral location of the unit prior to and during engagement of rollers 35 and 55 with their respective cams, an auxiliary track 70 is secured to track 7 which confines the rollers 6 to a definite lateral path of travel and resists the lateral thrust of rollers 35 and 55 and insures uniform oscillation of the mold sections and ware support by the cams.

The wheeled undercarriage frame 4, Fig. 5, and the ware support, Fig. 6, are preferably one-piece die castings, of metal, plastics or concrete. In the case of the undercarriage frame 4, the attaching bolts 3, hinge pin 12, axle 72, pivot pin 51 and stop screw 67 are all inserted in the die or form before the cast is made to become permanently bedded in the casting and an integral part thereof. Likewise, the bushing 50 and cam follower 53 of the ware support.

This invention is also adaptable to slip casting pottery ware with or without appendages such as creamers, gravys and the like. Figs. 16 and 17 illustrate how the apparatus may be modified for this purpose. The open frame truck 73 supports a plural section, slip casting plaster mold 74 having an inlet 75 leading to a molding cavity 76. The mold is assembled on a hinge pin 77 and held together by a spring clamp 78, the sections being closed around a bottom forming mold portion 79, Fig. 17, dowelled to the ware support 80 by two dowels 81 to thereby laterally position and vertically support the mold. The mold is opened by cams 82 through cam followers 83 and closed by a spring 84. The mold may be manually or automatically charged with slip then after a clay wall of optimum thickness has formed, the surplus slip is drained out, the mold is opened and the bottom with ware thereon is moved out amply clear of the mold for quick removal. Thereafter, the mold is reassembled in reverse order. A cam 85 through follower 86 withdraws the ware support and a spring 87 replaces it. The frame 73 may be mounted on wheels 88 and connected to a flexible conveyor, or secured to a rotary table or to the tray of an undulating conveyor, not shown, for transporting the same to mold filling, emptying, takeout, and drying positions.

Emptying surplus slip from the mold may be effected through inversion of the mold at one or more of the undulations or sucked out by vacuum through a nozzle inserted to within close adjacency of the ware bottom, substantially as disclosed in my Patent No. 2,046,525.

I claim:

1. Potteryware slip casting apparatus having a separable mold provided with a cavity in which the article is formed, means attached to each mold section to be engaged and moved to open the mold, a resilient member opposing the opening of the mold for closing the same when the opening pressure is released, a relatively movable ware support and a resilient member for moving said ware support.

2. Potteryware slip casting apparatus comprising separable sections each composed of plaster of Paris having a multiple of plaster hinge bearings formed therein that are hardened and lubricated to resist wear.

3. Pottery slip casting apparatus having a hinge pin and a separable slip casting mold held together on the hinge pin by a spring clamp.

4. Pottery slip casting apparatus having a support, a hinge pin mounted thereon, a mold centering formation spaced therefrom having a hold receiving surface, a separable slip casting mold mounted on the hinge pin having one end thereof normally resting on the mold receiving surface of the mold centering formations, and mold centering abutments beneath each mold section for engagement with said mold centering formation.

5. Pottery slip casting apparatus having a plaster mold composed of separable sections hingedly connected together formed with a passageway through the hinge joint when the mold is open to enable passage of air therethrough.

6. Potteryware slip casting apparatus including a separable mold and a movable ware support, and a frame for supporting said mold and ware support of open construction beneath the mold and ware support to permit free fall of dirt therethrough.

7. Potteryware slip casting apparatus having a separable casting mold having a molding cavity provided with a sealing joint therearound having sharp mating edges, means for parting the mold sections to a predetermined degree and for a predetermined time after each emptying and means for drying the interior of the mold whilst parted operable to direct a stream of drying air against the sealing joints for a predetermined time to thereby dry and harden the same and blow dirt particles therefrom, said mold being vented to permit the free escape of air and dirt particles.

8. Potteryware slip casting apparatus including a relatively movable ware support and separable appendage casting mold and adjustable means for limiting upward tilting of the ware support when in associated relation with the mold.

9. Pottery slip casting apparatus having a mold support having raised, spaced mold receiving surfaces, a hinge pin projecting upwardly from one of said surfaces, a separable slip casting mold removably mounted on said hinge pin and resting on said spaced mold receiving surfaces to thereby raise the base of the mold above the support and provide dirt clearance space.

10. Pottery slip casting apparatus having a mold provided with separable sections each provided with one or more sockets in the outside wall approximately opposite the center of the molding cavity to receive and locate the ends of one or more spring clamps for holding the sections together.

11. A hinged separable slip casting mold having a molding cavity, and a rear vent through the hinge joint leading inwardly from the exterior of the mold to ventilate internal surfaces adjacent the molding cavity.

12. Potteryware appendaging apparatus having an appendaging mold comprising separable sections each composed of plaster of Paris having upper and lower plaster hinge bearings formed therein whose bearing surfaces are coated with a substance such as shellac to provide wear resistant surfaces.

13. Potteryware appendaging apparatus having an appendage mold and a ware support movable relative thereto the support having a one-piece, cast, ware centering and thrust member mounted thereon adapted for quick detachment and replacement.

14. Potteryware appendaging apparatus having a separable appendage mold, a relatively movable ware support, means for relatively moving said ware support and mold to grip the ware therebetween and a three-point support for said ware support to thereby stabilize said ware support.

15. Potteryware appendaging apparatus having a separable appendaging mold, means for pressing prefabricating ware thereagainst and a plurality of inside gauges for sizing the ware detachably associated with the means having identification for distinguishing between gauge sizes.

16. Potteryware appendaging apparatus having an appendaging mold, means for pressing prefabricated ware thereagainst and means, over which the ware is inverted, for restoring out-of-shape brims to original form.

17. Potteryware appendaging apparatus having an appendage mold and a ware support movable relative thereto to press and seal ware against the mold having a one-piece ware centering and thrust piece detachably associated therewith.

18. Potteryware appendaging apparatus having a separable appendage mold having a ware-receiving surface, a ware support, and means for relatively moving the ware support and mold to co-operate ware with the ware receiving surface of the mold including a yieldable pressure applying member by means of which the value of the pressure applied to hold the ware against the mold, is automatically varied as between ware of different wall thickness.

19. Potteryware appendaging apparatus having a separable mold having an appendage molding cavity provided with an outlet and a ware receiving surface surrounding the outlet, a ware support movable relative thereto to co-operate ware with the ware-receiving surface, means for guiding the ware support during movement toward and away from the mold, there being lateral clearance between the ware support and guide, and means for maintaining the clearance constantly in a predetermined direction to insure positive alignment of the ware and mold incident to parting the mold or relieving pressure on the ware to thereby preclude breaking or shearing off the appendage at the mold.

20. A method of appendaging prefabricated pottery ware with a mold having a molding cavity provided with an inlet and an outlet spaced therefrom defining the terminal portion of the appendage which comprises, pressing the ware into sealing engagement with the surface of the mold surrounding the outlet, filling the mold with liquid slip to become hardened and attached to the ware and, before the appendage has finally set reducing the pressure on the ware, then permitting the appendage to become fully hardened and thereafter opening the mold and removing the ware.

21. Potteryware slip casting apparatus having a casting mold provided with separable sections hingedly connected together, means for opening and closing the mold, a ware support including a detachable member against which the ware rests movable toward and away from the mold and means for actuating said ware support including a resilient member for moving the support in one direction and a cam moving the support in another direction.

22. An assembly for slip casting potteryware having a mold formed of separable sections composed of plaster, each section formed with a portion of a molding cavity and a portion of a split hinge bearing in the opposed mating surfaces thereof, a hinge pin on which the sections are assembled with the bearing portions in engagement with said hinge pin, a clamp holding said separable sections and the bearing formations together on the hinge pin and means associated with each mold section to be moved to spread the sections apart on the hinge pin.

23. An assembly for slip casting potteryware comprising a mold formed with separable sections composed of plaster, each section being formed with a portion of the molding cavity and a portion of a split bearing in the inside mating surface, a hinge pin on which the sections are assembled, a clamp for holding the mold sections and the bearings together on the hinge pin, said clamp enabling the mold sections to be spread apart whilst in associated relation with the hinge pin, means for spreading said mold sections apart and a ware support movable relative to said mold.

24. An assembly for slip casting potteryware comprising a mold formed with separable sections composed of plaster, each section being formed with a portion of the molding cavity and a portion of a split bearing in the inside mating surface, a hinge pin on which the sections are assembled, a clamp for holding the mold sections and the bearings together on the hinge pin, said clamp enabling the mold sections to be spread apart whilst in associated relation with the hinge pin, means for spreading said mold sections apart, a ware support movable relative to said mold and resilient means for holding said ware support in a position of cooperation with said mold.

25. An assembly for slip casting potteryware having a mold formed of separable sections composed of plaster each section formed with a portion of a molding cavity and a portion of a split hinge bearing on the inside mating surface, each mold section further having an external ware receiving surface, a hinge pin on which said mold sections are mounted with the bearing portions in engagement therewith, a clamp for holding said bearings and said mold sections together on said hinge pin said clamp being yieldable to enable said mold sections to be spread apart to open the mold with the bearings remaining in association with the hinge pin, a ware support movable relative to said mold and positioned in front of the ware receiving surface of the mold to be moved toward said mold to engage ware with the ware receiving surface thereof and resilient means for holding the ware support in cooperative relation with the mold.

26. Potteryware appendaging apparatus having a separable appendage mold, a ware support, actuating means for relatively moving the same into associated relation self-adjustable to enable accommodation of ware of different diameters and/or thickness and means for limiting the approach of the mold and ware support.

27. Potteryware appendaging apparatus having a separable appendage mold, a ware support, actuating means for moving the ware support into appendaging relation including a tensioned resilient member urging the ware support into associated relation to be further tensioned by retraction of the ware support therefrom.

28. Potteryware appendaging apparatus having a separable appendage mold, a ware support and cam actuated means for relatively moving the ware support and mold in one direction and self-adjustable means for enabling accommodation of ware of different diameters and thickness between the mold and support for relatively moving the mold and support in another direction.

29. Potteryware appendaging apparatus having a separable appendage mold, cam actuated means for opening and closing the mold, a ware support, cam actuated means for retracting the ware support from the mold and a resilient member for moving the ware support into associated relation with the mold.

30. Potteryware appendaging apparatus having a separable appendaged mold, cam-actuated means for opening the mold and a resilient member for closing the mold, a ware support rotatable about an axis, cam actuated means for retracting the ware support from the mold and means including a tension member for moving the ware support into associated relation with the mold, said tension member enabling, automatically, the adjustment of the spacing between the molds and ware-support when in closed relation to thereby compensate for variations in ware thickness whilst applying substantially the same sealing pressure to the ware.

31. In apparatus for appendaging potteryware, a travelling carrier provided with a separable appendage mold and a ware support rotatable about an axis, cam-actuated means for rotating the support and opening the mold, stationary cams to be engaged by the cam-actuated means upon relative movement between the cams and carriage to actuate the cam-actuated means.

32. In apparatus for appendaging potteryware, a travelling carrier having a separable appendage mold and ware support mounted thereon, means for moving the mold sections including an adjustable cam and a cam follower to be actuated by the cam upon relative movement between the carriage and the cam and means for moving the ware support relative to the mold including an elongated adjustable cam and a cam follower to be actuated by the cam upon relative movement between the carriage and the cam.

33. In apparatus for appendaging potteryware, a travelling carriage having a hinge pin mounted thereon, a separable appendage mold mounted on the hinge pin, cam actuated means for opening and closing the mold, a ware support and means for moving the ware support relative to the mold including a self-adjustable tension member adapted to permit the necessary clearance between the mold and ware support to accommodate ware of different diameter and thickness at substantially the same sealing pressure between the ware and mold.

34. A slip casting mold composed of plaster of Paris formed with separable sections each section containing a portion of a molding cavity and a portion of a split bearing formed in the mating surface of each of said sections.

35. A slip casting mold composed of plaster of Paris formed with separable sections each section containing a portion of a molding cavity and a portion of a split bearing formed in the mating surface of each of said sections, each of said bearing surfaces being impregnated with an agent capable of rendering said surface resistant to wear.

36. An appendaging mold composed of plaster and formed of separable sections each section having a portion of a molding cavity and a split bearing formed on the inside mating surface of each section, said mold sections also being formed with an external ware receiving surface having an opening therein leading to the molding cavity portion.

WILLIAM J. MILLER.